(12) United States Patent
Kiilerich Pratas et al.

(10) Patent No.: US 12,166,727 B2
(45) Date of Patent: Dec. 10, 2024

(54) DECODING PATH GENERATION

(71) Applicant: NOKIA TECHNOLOGIES OY, Espoo (FI)

(72) Inventors: Nuno Manuel Kiilerich Pratas, Gistrup (DK); Oana-Elena Barbu, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 426 days.

(21) Appl. No.: 17/720,929

(22) Filed: Apr. 14, 2022

(65) Prior Publication Data

US 2022/0337383 A1     Oct. 20, 2022

(30) Foreign Application Priority Data

Apr. 16, 2021  (FI) ...................................... 20215451

(51) Int. Cl.
*H04L 5/00*         (2006.01)
*H04W 72/0446*   (2023.01)
(Continued)

(52) U.S. Cl.
CPC .......... *H04L 5/0098* (2013.01); *H04L 5/0046* (2013.01); *H04W 72/0446* (2013.01); *H04W 72/0453* (2013.01); *H04W 76/14* (2018.02)

(58) Field of Classification Search
CPC ... H04L 5/0098; H04L 5/0046; H04L 5/0094; H04L 5/0051; H04L 5/0048;
(Continued)

(56) References Cited

U.S. PATENT DOCUMENTS

2019/0261324 A1   8/2019  Nam et al.
2020/0336276 A1   10/2020 Tang et al.
(Continued)

FOREIGN PATENT DOCUMENTS

KR        20200120533 A       10/2020
WO    WO 2019/221533 A1    11/2019

OTHER PUBLICATIONS

Finnish Office Action and Search Report dated Oct. 7, 2021 corresponding to Finnish Patent Application No. 20215451.
(Continued)

*Primary Examiner* — Steven Hieu D Nguyen
(74) *Attorney, Agent, or Firm* — SQUIRE PATTON BOGGS (US) LLP

(57) ABSTRACT

According to an example embodiment, a client device is configured to receive at least one sidelink signal in a time slot over a plurality of subchannels; identify, using at least one detection model, a plurality of potentially active demodulation reference signal configurations out of a plurality of possible demodulation reference signal configurations in the time slot across the plurality of subchannels based on the at least one sidelink signal, wherein each demodulation reference signal configuration defines demodulation reference signal transmissions in the time slot; identify payload transmissions in the time slot based on the identified plurality of potentially active demodulation reference signal configurations in the time slot; and create at least one decoding path for the payload transmissions in the time slot based on the identified payload transmissions in the time slot and the identified plurality of potentially active demodulation reference signal configurations. Devices, methods and computer programs are disclosed.

20 Claims, 9 Drawing Sheets

(51) Int. Cl.
*H04W 72/0453* (2023.01)
*H04W 76/14* (2018.01)

(58) Field of Classification Search
CPC ......... H04W 72/0446; H04W 72/0453; H04W 76/14; G06N 3/08
See application file for complete search history.

(56) References Cited

U.S. PATENT DOCUMENTS

| | | | |
|---|---|---|---|
| 2021/0091838 A1 | 3/2021 | Bai et al. | |
| 2021/0105118 A1* | 4/2021 | Wu | H04W 72/20 |
| 2021/0105121 A1 | 4/2021 | Chae et al. | |
| 2021/0235420 A1* | 7/2021 | Kim | H04L 1/1812 |

OTHER PUBLICATIONS

Extended European Search Report dated Sep. 16, 2022, corresponding to European Patent Application No. 22166881.7.

\* cited by examiner

DECODING PATH GENERATION

TECHNICAL FIELD

The present application generally relates to the field of wireless communications. In particular, the present application relates to a client for wireless communication, and related methods and computer programs.

BACKGROUND

Sidelink (SL) communication allows direct communication between two client devices without going through a base station. At least in some modes of operation, SL resource allocation is based on autonomous allocation or selection of resources from a preconfigured transmission resource pool by transmitting client device. The resource selection can be based on a simple random selection or sensing-based selection. It is possible that even after the sensing procedure has taken place, that a collision between multiple transmissions occurs. Thus, it may be desirable for the client device to be capable of decoding multiple overlapping SL transmission.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a client device comprises at least one processor and at least one memory comprising computer program code. The at least one memory and the computer program code are configured to, with the at least one processor, cause the client device to: receive at least one sidelink signal in a time slot over a plurality of subchannels; identify, using at least one detection model, a plurality of potentially active demodulation reference signal configurations out of a plurality of possible demodulation reference signal configurations in the time slot across the plurality of subchannels based on the at least one sidelink signal, wherein each demodulation reference signal configuration defines demodulation reference signal transmissions in the time slot; identify a plurality of payload transmissions in the time slot based on the identified plurality of potentially active demodulation reference signal configurations in the time slot; and create at least one decoding path for the plurality of payload transmissions in the time slot based on the identified plurality of payload transmissions in the time slot and the identified plurality of potentially active demodulation reference signal configurations. The client device can, for example, efficiently generate the at least one decoding path.

An example embodiment of a client device comprises means for performing: receive at least one sidelink signal in a time slot over a plurality of subchannels; identify, using at least one detection model, a plurality of potentially active demodulation reference signal configurations out of a plurality of possible demodulation reference signal configurations in the time slot across the plurality of subchannels based on the at least one sidelink signal, wherein each demodulation reference signal configuration defines demodulation reference signal transmissions in the time slot; identify a plurality of payload transmissions in the time slot based on the identified plurality of potentially active demodulation reference signal configurations in the time slot; and create at least one decoding path for the plurality of payload transmissions in the time slot based on the identified plurality of payload transmissions in the time slot and the identified plurality of potentially active demodulation reference signal configurations.

In an example embodiment, alternatively or in addition to the above-described example embodiments, the demodulation reference signal transmissions in the time slot comprise at least demodulation reference signal transmissions for a control channel and demodulation reference signal transmissions for a data channel, and wherein the plurality of payload transmissions comprises at least the control channel and the data channel. The client device can, for example, generate at least one decoding path for the control channel transmission and data channel transmission based on the demodulation reference signal transmissions.

In an example embodiment, alternatively or in addition to the above-described example embodiments, the plurality of payload transmissions comprises physical sidelink control channel, PSCCH, transmissions and/or physical sidelink shared channel, PSSCH, transmissions, and the demodulation reference signal transmissions comprise PSCCH demodulation reference signal, DMRS, transmissions and/or PSSCH DMRS transmission. The client device can, for example, generate at least one decoding path for the PSCCH and PSSCH transmission based on the DMRS.

In an example embodiment, alternatively or in addition to the above-described example embodiments, the at least one detection model comprises at least one machine learning model. The client device can, for example, efficiently identify the plurality of potentially active demodulation reference signal configurations using the at least one machine learning model.

In an example embodiment, alternatively or in addition to the above-described example embodiments, at least one machine learning model comprises at least one of: a multi-label multi-class classifier, a neural network, a deep neural network, or a decision forest. The client device can, for example, efficiently identify the plurality of potentially active demodulation reference signal configurations.

In an example embodiment, alternatively or in addition to the above-described example embodiments, the at least one machine learning model is configured to take modulated symbols or in-phase—quadrature-phase, IQ, samples of a subchannel in the plurality of subchannels as an input and output a probability value for each configuration in the plurality of possible demodulation reference signal configurations being active in the subchannel, wherein each configuration in the plurality of possible demodulation reference signal configurations defines active demodulation reference signal transmissions in the subchannel. The client device can, for example, efficiently identify the plurality of potentially active demodulation reference signal configurations based on the modulated symbols or IQ samples.

In an example embodiment, alternatively or in addition to the above-described example embodiments, the at least one memory and the computer program code are further configured to, with the at least one processor, cause the client device to identify the payload transmissions in the time slot based on the identified plurality of potentially active demodulation reference signal configurations in the time slot by correlating between symbols across subchannels in the plurality of subchannel in order to identify payload transmission occurring across subchannels in the plurality of subchannels. The client device can, for example, efficiently identify payload transmission occurring across subchannels.

In an example embodiment, alternatively or in addition to the above-described example embodiments, the at least one machine learning model comprises a first machine learning model trained for low mobility and a second machine learning model trained for high mobility. The client device can, for example, efficiently identify the plurality of potentially active demodulation reference signal configurations both in low mobility and high mobility scenarios.

In an example embodiment, alternatively or in addition to the above-described example embodiments, the at least one memory and the computer program code are further configured to, with the at least one processor, cause the client device to create the at least one decoding path for the payload transmissions in such a way that the at least one decoding path maximises a number of decoded transmissions. The client device can, for example, efficiently generate the at least one decoding path in such a way that the number of decoded transmissions is maximised.

In an example embodiment, alternatively or in addition to the above-described example embodiments, the at least one memory and the computer program code are further configured to, with the at least one processor, cause the client device to create the at least one decoding path for the payload transmissions by performing: compute a reference signal received power, RSRP, for each demodulation reference signal configuration in the plurality of potentially active demodulation reference signal configurations; rank the plurality of potentially active demodulation reference signal configurations according to the computed RSRP of each potentially active demodulation reference signal configuration; and create the at least one decoding path based on the ranking of the plurality of potentially active demodulation reference signal configurations. The client device can, for example, efficiently generate the at least one decoding path in such a way that the strongest transmissions are decoded first.

In an example embodiment, alternatively or in addition to the above-described example embodiments, the at least one memory and the computer program code are further configured to, with the at least one processor, cause the client device to create the at least one decoding path based on the ranking by excluding from at least one decoding path potentially active demodulation reference signal configurations with an RSRP lower than a preconfigured threshold RSRP. The client device can, for example, efficiently generate the at least one decoding path in such a way that the strongest transmissions are decoded first based on the threshold RSRP.

In an example embodiment, alternatively or in addition to the above-described example embodiments, the at least one memory and the computer program code are further configured to, with the at least one processor, cause the client device to decode the payload transmission according to the created at least one decoding path. The client device can, for example, efficiently decode the transmissions.

In an example embodiment, alternatively or in addition to the above-described example embodiments, the at least one memory and the computer program code are further configured to, with the at least one processor, cause the client device to: in response to the at least one decoding path being successful in decoding the plurality of payload transmissions in the time slot, store input and outputs of the at least one machine learning model; and retrain the at least one machine learning model using the stored inputs and outputs. The client device can, for example, efficiently retrain the at least one machine learning model for new scenarios.

An example embodiment of a method comprises: receiving at least one sidelink signal in a time slot over a plurality of subchannels; identifying, using at least one detection model, a plurality of potentially active demodulation reference signal configurations out of a plurality of possible demodulation reference signal configurations in the time slot across the plurality of subchannels based on the at least one sidelink signal, wherein each demodulation reference signal configuration defines demodulation reference signal transmissions in the time slot; identifying a plurality of payload transmissions in the time slot based on the identified plurality of potentially active demodulation reference signal configurations in the time slot; and creating at least one decoding path for the plurality of payload transmissions in the time slot based on the identified plurality of payload transmissions in the time slot and the identified plurality of potentially active demodulation reference signal configurations. The method can, for example, efficiently generate the at least one decoding path.

In an example embodiment, alternatively or in addition to the above-described example embodiments, the demodulation reference signal transmissions in the time slot comprise at least demodulation reference signal transmissions for a control channel and demodulation reference signal transmissions for a data channel, and wherein the plurality of payload transmissions comprises at least the control channel and the data channel. The method can, for example, generate at least one decoding path for the control channel transmission and data channel transmission based on the demodulation reference signal transmissions.

In an example embodiment, alternatively or in addition to the above-described example embodiments, the plurality of payload transmissions comprises physical sidelink control channel, PSCCH, transmissions and/or physical sidelink shared channel, PSSCH, transmissions, and the demodulation reference signal transmissions comprise PSCCH demodulation reference signal, DMRS, transmissions and/or PSSCH DMRS transmission. The method can, for example, generate at least one decoding path for the PSCCH and PSSCH transmission based on the DMRS.

In an example embodiment, alternatively or in addition to the above-described example embodiments, the at least one detection model comprises at least one machine learning model. The method can, for example, efficiently identify the plurality of potentially active demodulation reference signal configurations using the at least one machine learning model.

In an example embodiment, alternatively or in addition to the above-described example embodiments, at least one machine learning model comprises at least one of: a multi-label multi-class classifier, a neural network, a deep neural network, or a decision forest. The method can, for example, efficiently identify the plurality of potentially active demodulation reference signal configurations.

In an example embodiment, alternatively or in addition to the above-described example embodiments, the at least one machine learning model is configured to take modulated symbols or in-phase—quadrature-phase, IQ, samples of a subchannel in the plurality of subchannels as an input and output a probability value for each configuration in the plurality of possible demodulation reference signal configurations being active in the subchannel, wherein each configuration in the plurality of possible demodulation reference signal configurations defines active demodulation reference signal transmissions in the subchannel. The method can, for example, efficiently identify the plurality of potentially active demodulation reference signal configurations based on the modulated symbols or IQ samples.

In an example embodiment, alternatively or in addition to the above-described example embodiments, the identifying the payload transmissions in the time slot based on the identified plurality of potentially active demodulation reference signal configurations in the time slot comprises correlating between symbols across subchannels in the plurality of subchannel in order to identify payload transmission occurring across subchannels in the plurality of subchannels. The method can, for example, efficiently identify payload transmission occurring across subchannels.

In an example embodiment, alternatively or in addition to the above-described example embodiments, the at least one machine learning model comprises a first machine learning model trained for low mobility and a second machine learning model trained for high mobility. The method can, for example, efficiently identify the plurality of potentially active demodulation reference signal configurations both in low mobility and high mobility scenarios.

In an example embodiment, alternatively or in addition to the above-described example embodiments, the at least one decoding path for the payload transmissions is created in such a way that the at least one decoding path maximises a number of decoded transmissions. The method can, for example, efficiently generate the at least one decoding path in such a way that the number of decoded transmissions is maximised.

In an example embodiment, alternatively or in addition to the above-described example embodiments, the creating the at least one decoding path for the payload transmissions comprises: computing a reference signal received power, RSRP, for each demodulation reference signal configuration in the plurality of potentially active demodulation reference signal configurations; ranking the plurality of potentially active demodulation reference signal configurations according to the computed RSRP of each potentially active demodulation reference signal configuration; and creating the at least one decoding path based on the ranking of the plurality of potentially active demodulation reference signal configurations. The method can, for example, efficiently generate the at least one decoding path in such a way that the strongest transmissions are decoded first.

In an example embodiment, alternatively or in addition to the above-described example embodiments, the at least one decoding path based on the ranking is created by excluding from at least one decoding path potentially active demodulation reference signal configurations with an RSRP lower than a preconfigured threshold RSRP. The method can, for example, efficiently generate the at least one decoding path in such a way that the strongest transmissions are decoded first based on the threshold RSRP.

In an example embodiment, alternatively or in addition to the above-described example embodiments, the method further comprises decoding the payload transmission according to the created at least one decoding path. The method can, for example, efficiently decode the transmissions.

In an example embodiment, alternatively or in addition to the above-described example embodiments, the method further comprises, in response to the at least one decoding path being successful in decoding the plurality of payload transmissions in the time slot, storing input and outputs of the at least one machine learning model; and retraining the at least one machine learning model using the stored inputs and outputs. The method can, for example, efficiently retrain the at least one machine learning model for new scenarios.

An example embodiment of a computer program product comprises program code configured to perform the method according to any of the above example embodiments, when the computer program product is executed on a computer.

DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

Like reference numerals are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present disclosure may be constructed or utilized. The description sets forth the functions of the example and the sequence of steps for constructing and operating the example. However, the same or equivalent functions and sequences may be accomplished by different example embodiments.

Figure 1:
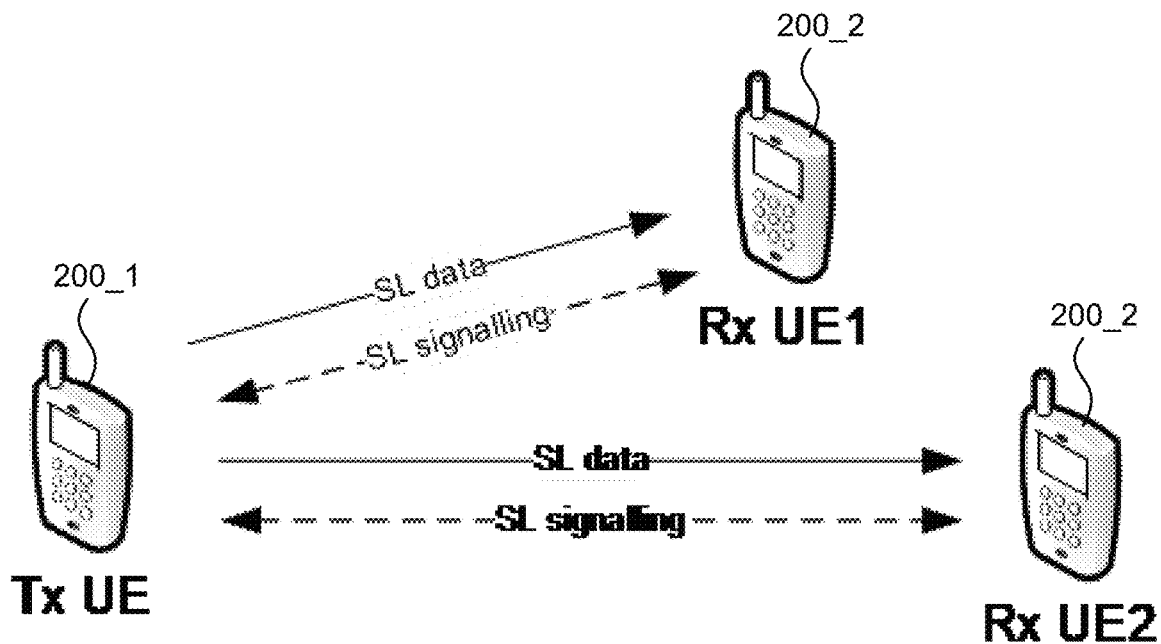
FIG. 1 shows an example embodiment of the subject matter described herein illustrating an example system in which various example embodiments of the present disclosure may be implemented.

FIG. 1 shows an example embodiment of the subject matter described herein illustrating an example system in which various example embodiments of the present disclosure may be implemented.

Sidelink (SL) communications between client devices 200 over the PC5 interface are based on the principle of transmitter-oriented one-to-many broadcast. This means that in principle there is no need for a connection setup for SL communication between client devices 200 on the radio-access level, regardless of whether SL communication is for unicast, groupcast or broadcast service.

On one hand, a transmitting (Tx) client device 200_1 can transmit SL to a receiving (Rx) client device 200_2 or a group of Rx client devices 200_2 or all Rx client devices 200_2 in proximity of the Tx client device 200_1, using resources from a (pre-)configured resource pool, at least for transmitting SL control information (SCI) which is used as a scheduling assignment for a SL data transmission. On the other hand, the Rx client device 200_2 may need to keep monitoring over the (pre-)configured resource pool to receive SL, at least receiving all SCI instances and determining whether a received SCI and corresponding SL data transmission is meant for the Rx client device 200_2 to receive or not, based on Source (SRC) and/or destination (DST) ID(s) indicated in the received SCI instances, SRC corresponding to Tx side and DST corresponding to Rx side. This can be applied for all casting types over SL: unicast, groupcast or broadcast.

There are two modes of resource allocation, referred to as Mode 1 and Mode 2, specified for a SL transmission. Mode 1 is based on using scheduled resources or grants from a serving base station (BS). This implies that a Tx client device 200_1 may need to be in RRC CONNECTED state of the serving BS in order to get Mode 1 resources allocated. Mode 2 is based on autonomous allocation or selection of resources from a preconfigured Tx resource pool by the Tx client device 200_1. The resource selection in Mode 2 can be based on a simple random selection or sensing-based selection. The latter may be preferred and used for normal operation while the former may be used for exceptional operations or situations with a particular, preconfigured resource pool. Mode 2 can be used for Tx client device 200_1 being in coverage (IC) or out-of-coverage (OoC), in RRC IDLE, RRC INACTIVE or RRC CONNECTED state.

Figure 2:
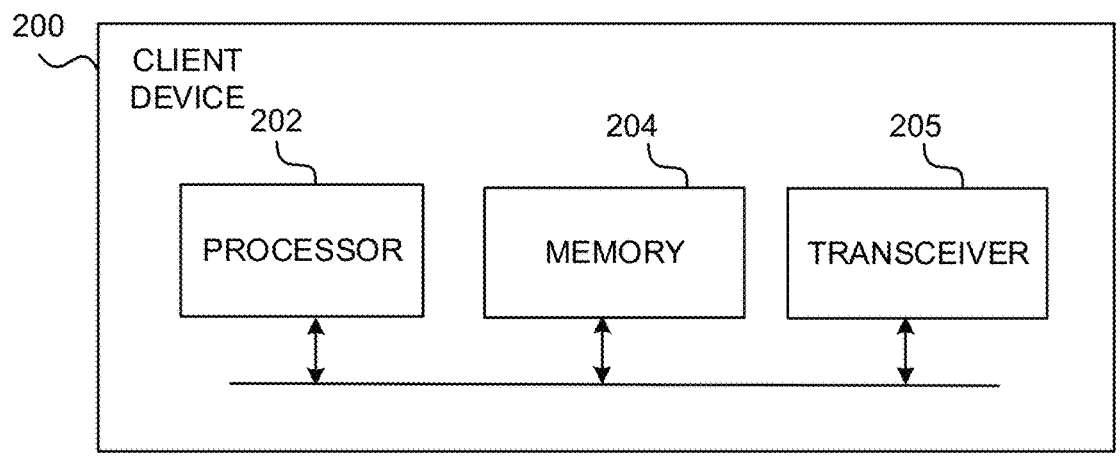
FIG. 2 shows an example embodiment of the subject matter described herein illustrating a client device.

FIG. 2 is a block diagram of a client device 200 in accordance with an example embodiment.

According to an example embodiment, the client device 200 comprises one or more processors 202, and one or more memories 204 that comprise computer program code. The client device 200 may also comprise a transceiver 205, as well as other elements, such as an input/output module (not shown in FIG. 2), and/or a communication interface (not shown in FIG. 2).

According to an example embodiment, the at least one memory 204 and the computer program code are configured to, with the at least one processor 202, cause the client device 200 to receive at least one sidelink signal in a time slot over a plurality of subchannels.

The client device 200 may receive the at least sidelink signal by, for example, receiving the at least one sidelink signal using the transceiver 205. Alternatively, some other device/module/component may receive the at least one sidelink signal and provide the at least one sidelink signal to the client device 200 and the client device 200 may obtain the at least one sidelink signal. Herein, "receive" may imply receiving the signal or obtaining data corresponding to the signal.

The client device 200 may, for example, sample, demodulated, and decode the at least one sidelink signal before using the at least one sidelink signal for further processing disclosed herein.

Herein, a time slot may also be referred to simply as a slot.

The client device 200 may be further configured to identify, using at least one detection model, a plurality of potentially active demodulation reference signal configurations out of a plurality of possible demodulation reference signal configurations in the time slot across the plurality of subchannels based on the at least one sidelink signal, wherein each demodulation reference signal configuration defines demodulation reference signal transmissions in the time slot.

The demodulation reference signal (DMRS) transmission may comprise, for example, physical sidelink control channel (PSCCH) DMRS transmission and/or physical sidelink shared channel (PSSCH) DMRS transmission.

The client device 200 may be further configured to identify a plurality of payload transmissions in the time slot based on the identified plurality of potentially active demodulation reference signal configurations in the time slot.

Herein a payload transmission may refer to any transmission that comprises payload data to be received by a client device. The payload data may comprise, for example, control channel data or data channel data.

The payload transmission may comprise, for example, control channel, such as PSCCH, transmissions and/or data channel, such as PSSCH, transmissions.

The client device 200 may be further configured to create at least one decoding path for the plurality of payload transmissions in the time slot based on the identified plurality of payload transmissions in the time slot and the identified plurality of potentially active demodulation reference signal configurations.

Herein, a decoding path may refer to an order in which the payload transmissions are decoded. A decoding path may also be referred to as a decoding order or similar.

The client device 200 may create the at least one decoding path in such way that the at least one decoding path maximises a number of decoded transmissions. For example, the at least one decoding path can indicate that a PSCCH transmission should be decoded before an associated PSSCH transmission.

According to an example embodiment, the demodulation reference signal transmissions in the time slot comprise at least demodulation reference signal transmissions for a control channel and demodulation reference signal transmissions for a data channel, and wherein the plurality of payload transmissions comprises at least the control channel and the data channel.

According to an example embodiment, the plurality of payload transmissions comprises physical sidelink control channel (PSCCH) transmissions and/or physical sidelink shared channel (PSSCH) transmissions, and the demodulation reference signal transmissions comprise PSCCH demodulation reference signal (DMRS) transmissions and/or PSSCH DMRS transmission.

The client device 200 can establish the relation between the PSCCH DMRS and PSSCH DMRS based on, for example, the correlation of their channels or based on the correlation between the associated transmitter imperfections, such as imperfections in the oscillator at the transmitter, the non-idealities in the amplifiers and the effects of those in the transmitted signal.

Although the client device 200 may be depicted to comprise only one processor 202, the client device 200 may comprise more processors. In an example embodiment, the memory 204 is capable of storing instructions, such as an operating system and/or various applications.

Furthermore, the processor 202 is capable of executing the stored instructions. In an example embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 202 may be configured to execute hard-coded functionality. In an example embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The client device 200 may be any of various types of devices used by an end user entity and capable of communication in a wireless network. Such devices include but are not limited to smartphones, tablet computers, smart watches, laptop computers, Internet-of-Things (IoT) devices, etc. The client device 200 may comprise, for example, a mobile phone, a smartphone, a tablet computer, a smart watch, or any hand-held or portable device or any other apparatus, such as a vehicle, a robot, or a repeater. The client device 200 may also be referred to as a user equipment (UE). The client device 200 may communicate with a network node device via, for example, an air/space born vehicle communication connection, such as a service link.

Some terminology used herein may follow the naming scheme of 4G or 5G technology in its current form. However, this terminology should not be considered limiting, and the terminology may change over time. Thus, the following discussion regarding any example embodiment may also apply to other technologies, such as 6G.

At least some example embodiments disclosed herein can enable the identification of decoding paths, which in turn enables the client device 200 to optimize the decoding.

Figure 3:
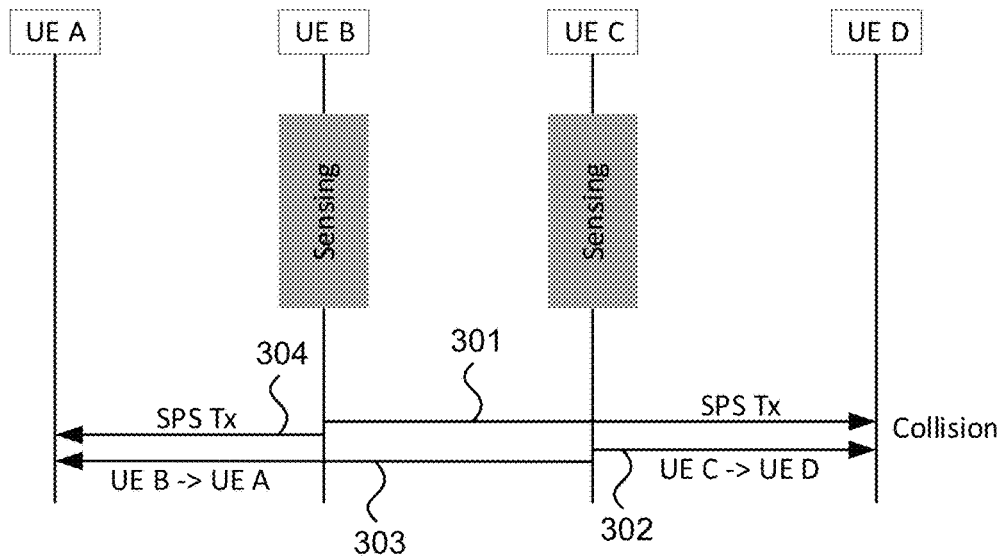
FIG. 3 shows an example of the subject matter described herein illustrating sidelink transmission collisions.

FIG. 3 shows an example of the subject matter described herein illustrating sidelink transmission collisions.

In the SL resource allocation Mode 2, it is possible, even after the sensing procedure has taken place, that a collision between multiple transmissions occurs. In SL resource allocation Mode 1, this can also occur for sidelink client devices at the cell edge.

A collision can be a consequence of simultaneous sensing and selection of the same resources. An example of this is illustrated in FIG. 3, where a semi-persistent scheduling (SPS) transmission 301 from client device B collides with a transmission 302 from client device C to client device D and an SPS transmission 303 from client device C collides with a transmission 304 from client device B to client device A.

Alternatively or additionally, a collision can also be a consequence of two nearby gNBs allocating the same SL resources to SL client devices in a cell edge.

Figure 4:
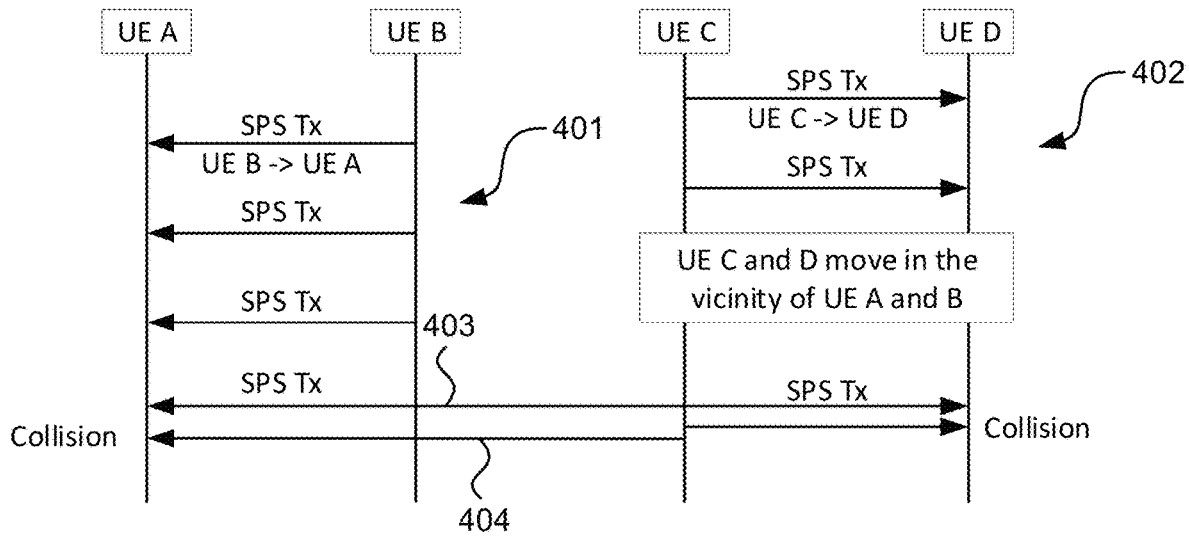
FIG. 4 shows another example of the subject matter described herein illustrating sidelink transmission collisions.

Alternatively or additionally, a collision can also be due to mobility. For example, SPS transmissions of different transmitting client devices may overlap in time. An example of this is illustrated in FIG. 4. First, client device B can perform SPS transmission 401 to client device A and client device C can perform SPS transmission 402 to client device D without collisions. However, when client device C and client device D move to the vicinity of client device A and client device B, SPS transmissions 403 from client device B to client device A can collide with SPS transmission 404 from client device C to client device D and vice versa.

It may be desirable that the Rx client device can detect the presence of collisions, in order to be able to indicate to its desired Tx client device to avoid it by, for example, selecting another Tx slot and/or be able to detect and decode as many collided transmissions as possible based, for example, on successive interference cancelation.

The configuration of the resources in the sidelink resource pool defines the minimum information required for a Rx UE to be able to decode a transmission, which includes the number of subchannels, the number of PRBs per subchannels, the number of symbols in the PSCCH, which slots have a Physical Sidelink Feedback Channel (PSFCH) and other configuration aspects not relevant to this invention.

However, the details of the actual sidelink transmission (i.e. the payload) is provided in the PSCCH (SCI 1st stage) for each individual transmission, which includes: The time and frequency resources, the DMRS configuration of the PSSCH, the MCS, PSFCH, among others.

Figure 5:
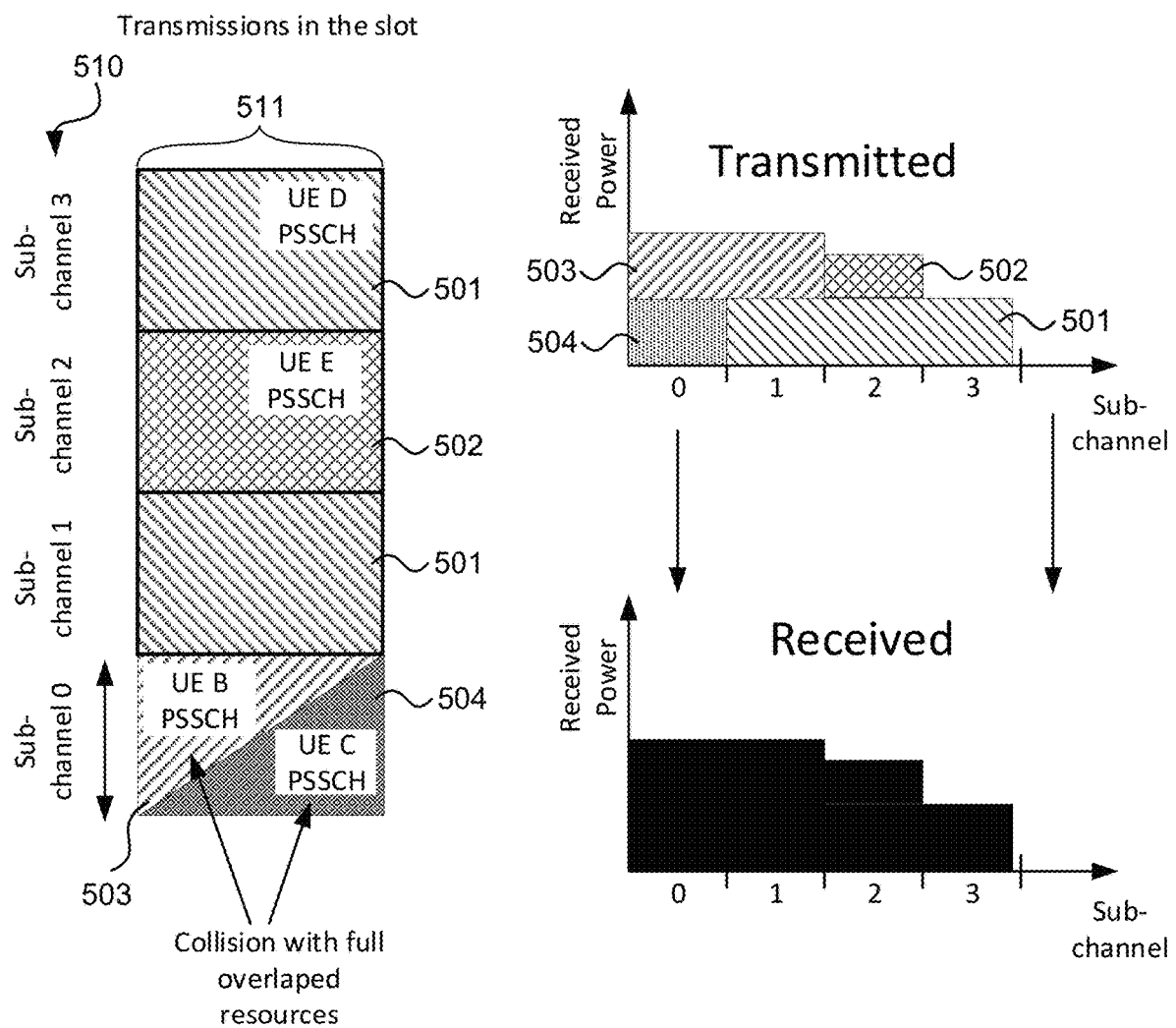
FIG. 5 shows an example of the subject matter described herein illustrating sidelink control channels and sidelink data channels during transmission collisions.

FIG. 5 shows an example of the subject matter described herein illustrating sidelink control channels and sidelink data channels during transmission collisions.

As different transmissions, such as PSCCH and PSSCH, within a slot can be partially or fully overlapped with each other, for a receiver to be able to "detangle" these transmissions, the receiver should derive the decoding order, also referred to as the decoding path, on a slot basis. Otherwise transmissions can be lost.

Before a PSSCH transmission can be decoded, the associated PSCCH should be detect and decode first. However, if that PSCCH is overlapped by another stronger transmission, such as PSCCH or even a PSSCH, the stronger transmission may need to be decoded, and subtracted from the composite signal, first.

It should be noted that, even if the PSCCH is decoded, it is possible that the associated PSSCH cannot be decoded successfully.

The example of FIG. 5 illustrates the collisions of various sidelink transmissions transmitted over a plurality of subchannels 510 in a time slot 511. PSSCH transmission 501 of UE D is disrupted by a PSCCH transmission 502 of UE E and a PSSCH transmission 503 of UE B. There is also a PSSCH transmission 504 of UE C in the time slot 511 that does not happen to disrupt the PSCCH transmission 501 of UE D.

Figure 6:
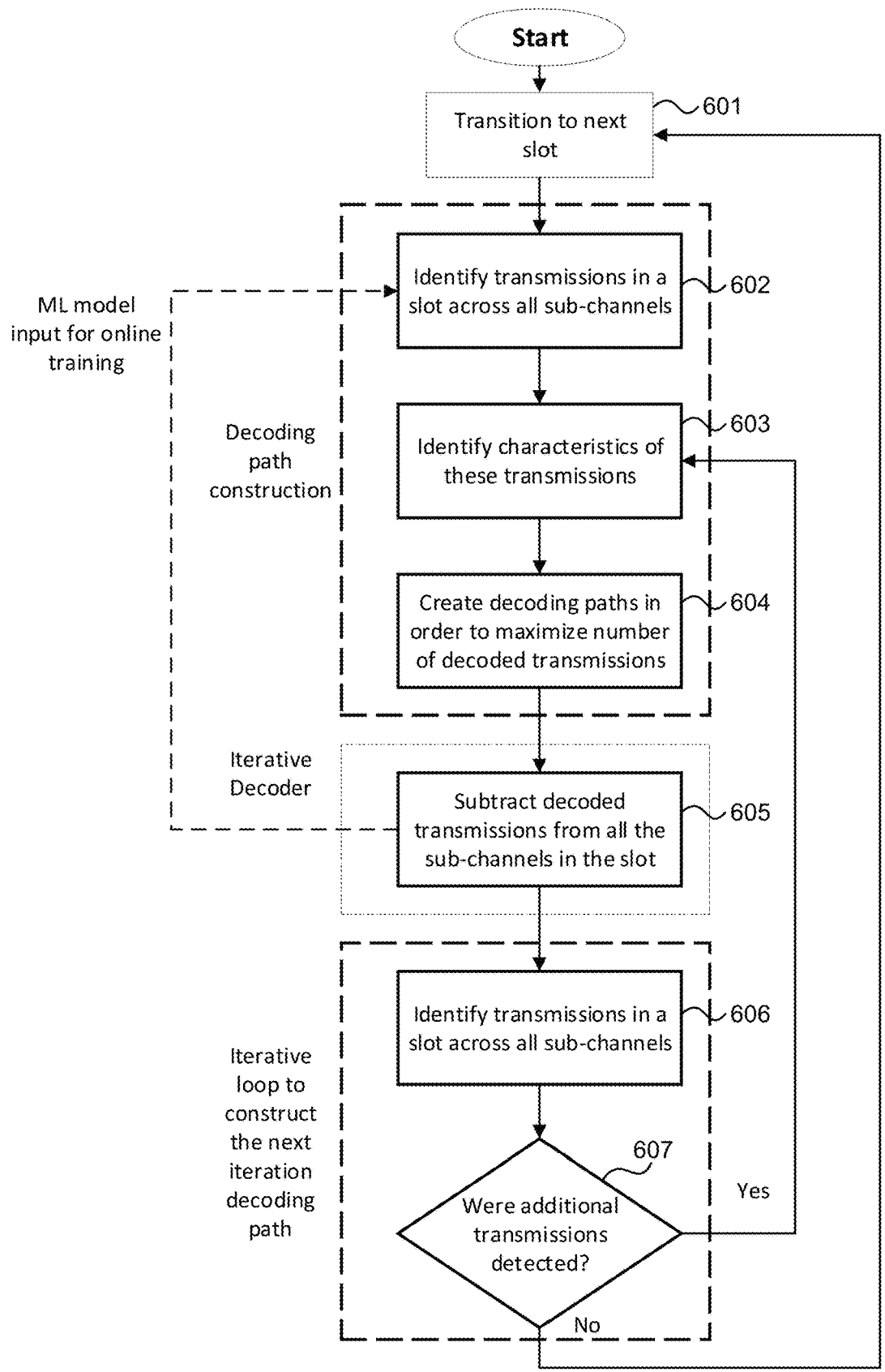
FIG. 6 shows an example embodiment of the subject matter described herein illustrating a flow chart of a sidelink transmission decoding procedure.

FIG. 6 shows an example embodiment of the subject matter described herein illustrating a flow chart of a sidelink transmission decoding procedure.

In operation 601, the client device 200 can transition to the next time slot. Thus, the procedure presented in FIG. 6 may be repeated for each time slot.

In operation 602, the client device 200 can detect within a time slot 511 all potential transmissions. This can comprise the detection of the PSCCH DMRS in all subchannels 510 and the detection of all possible PSSCH DMRS configurations present across all subchannels 510. This may be implemented with, for example, a multilabel multiclass classifier tailored to the specific PSCCH DMRS and PSSCH DMRS configurations. In particular, each classifier can output a probability value for each configuration of each channel being active in the time slot 511 as disclosed herein.

In operation 603, the client device 200 can identify the characteristics of the transmission, such as PSSCH details, based on the detected PSCCH (when these are decodable) by, for example, decoding first stage SCI. This operation can be performed based on the soft outputs of the classifier and the client device 200 can decide which configurations are to be tested based on, for example, the output probability being larger than a threshold (e.g. p=0.5).

In operation 604, the client device 200 can create the PSCCH and PSSCH decoding path using the output of operation 603.

The operations 602-604 can construct the decoding path.

In operation 605, the client device 200 can subtract the decoded transmissions from all the subchannels 510 in the time slot 511. In the case of an iterative decoder, the client device 200 may return to operation 602 in order to identify remaining transmissions.

In operation 606, the client device 200 can identify transmissions in a slot across all subchannels 510. The client device 200 may, for example, detect all DBMS configurations present.

In operation 607, the client device 200 can check whether additional transmissions are detected. If additional transmissions are detected, the client device 200 can return to operation 603. Otherwise, the client device 200 can return to operation 601 in order to repeat the procedure for other time slots.

Figure 7:
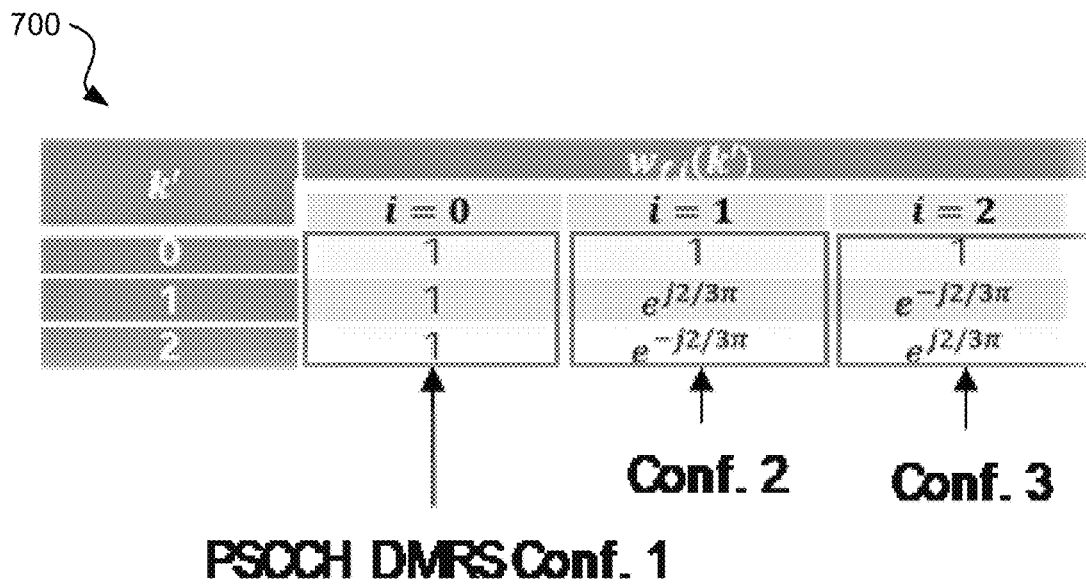
FIG. 7 shows an example embodiment of the subject matter described herein illustrating physical sidelink control channel demodulation reference signal configurations.

FIG. 7 shows an example embodiment of the subject matter described herein illustrating physical sidelink control channel demodulation reference signal configurations.

Examples of possible PSCCH DMRS configurations 700 are illustrated in FIG. 7. The PSCCH duration is part of the PSCCH DMRS configuration resource pool. The depicted configurations in FIG. 7 may correspond to the ones that the SL Tx client device 200 can select from. The PSCCH DMRS configuration can be done uniform randomly to increase robustness to collisions.

Figure 8:
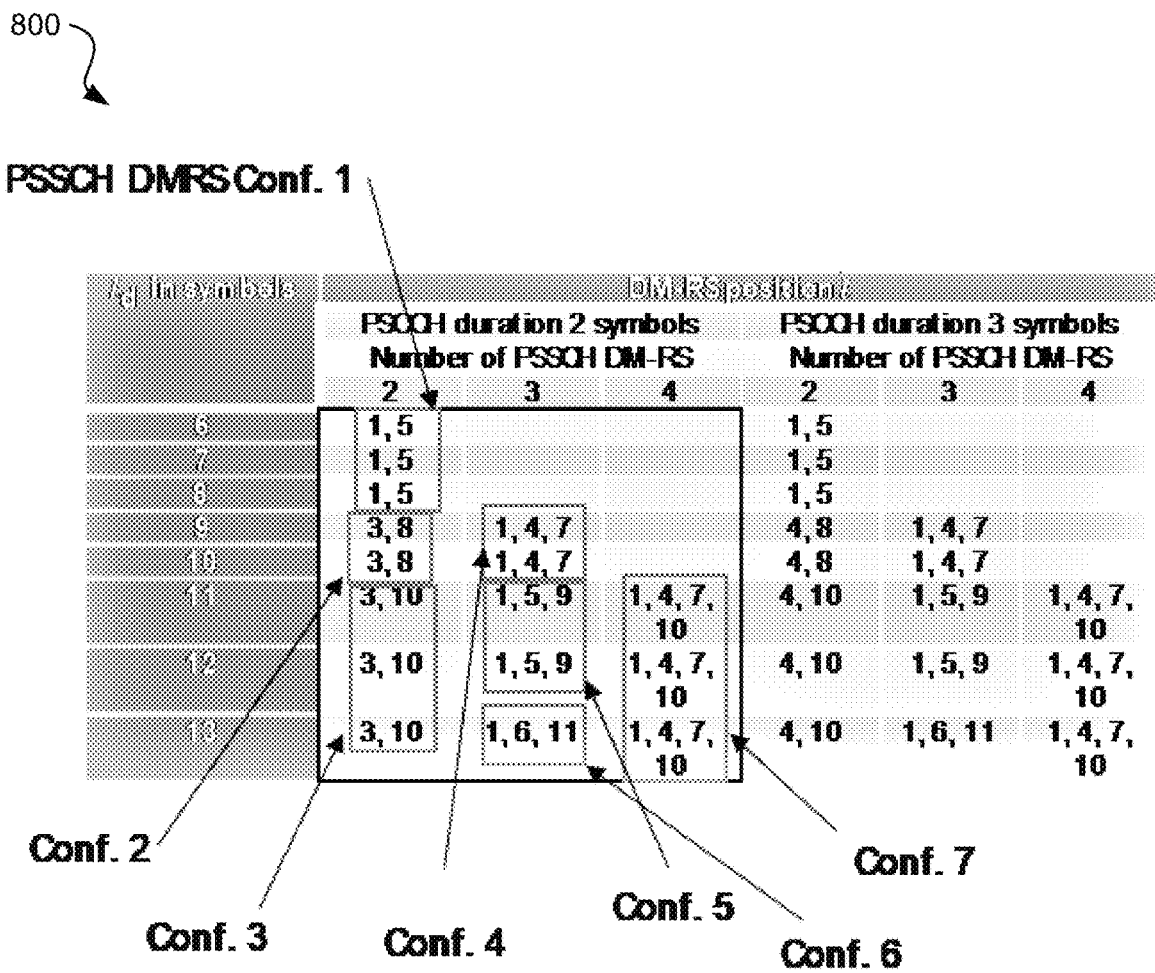
FIG. 8 shows an example embodiment of the subject matter described herein illustrating physical sidelink shared channel demodulation reference signal configurations.

FIG. 8 shows an example embodiment of the subject matter described herein illustrating physical sidelink shared channel demodulation reference signal configurations.

Examples of possible PSSCH DMRS configurations 800 are illustrated in FIG. 8. The PSSCH DMRS configuration can be done based on, for example, the client's mobility conditions (affects the number of DRMSs) and the amount of data payload (affects the number of selected slots).

Figure 9:
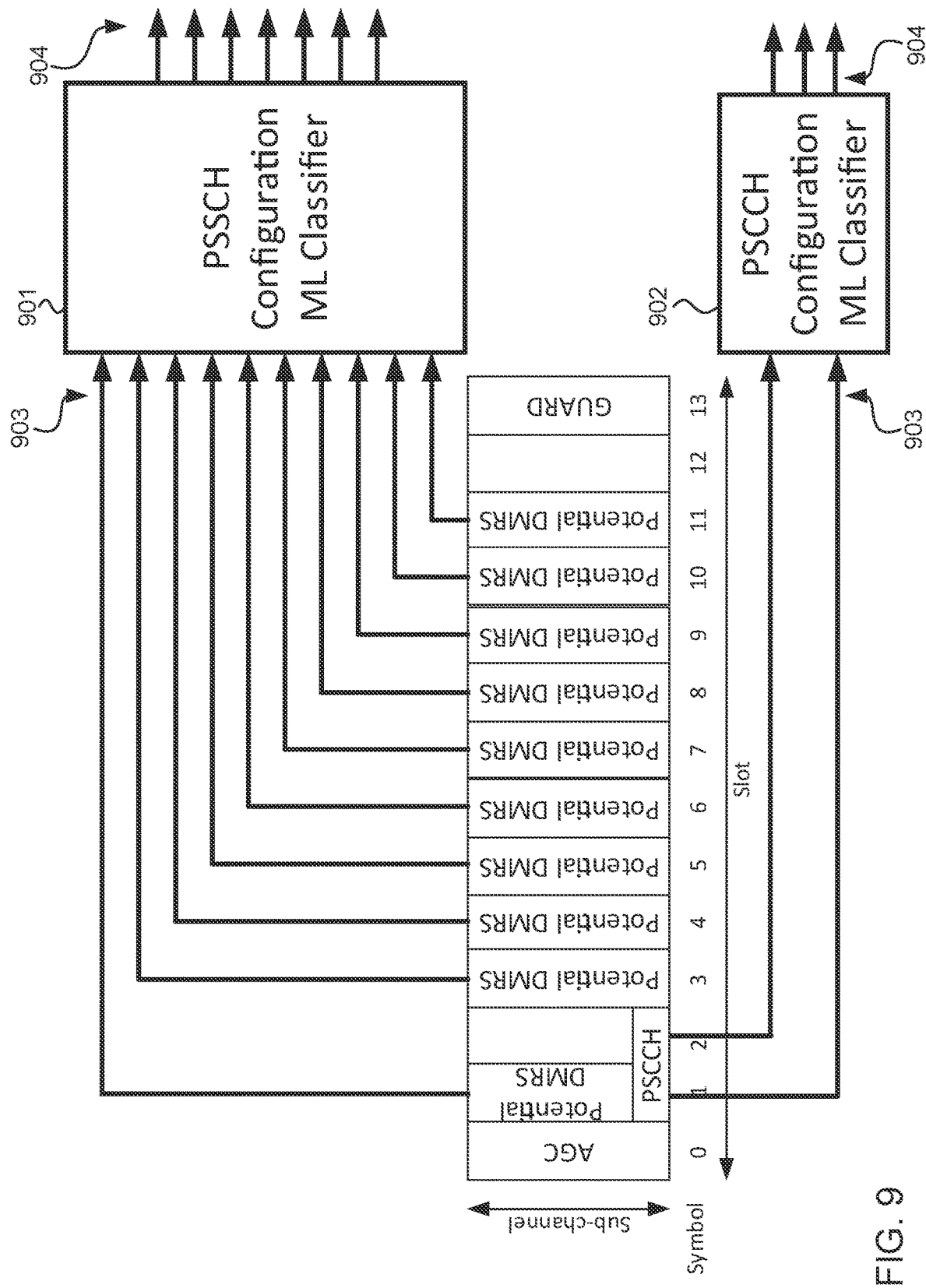
FIG. 9 shows an example embodiment of the subject matter described herein illustrating data flow in a machine learning model.

FIG. 9 shows an example embodiment of the subject matter described herein illustrating data flow in a machine learning model.

According to an example embodiment, the at least one detection model comprises at least one machine learning (ML) model.

For example, the example embodiment of FIG. 9 comprises a first ML model 901 for PSSCH DMRS configuration classification and a second ML model 902 for PSCCH DBMS configuration classification.

According to an example embodiment, the at least one machine learning model comprises at least one of: a multi-label multi-class classifier, a neural network, a deep neural network, or a decision forest.

According to an example embodiment, the at least one machine learning model is configured to take modulated symbols or in-phase—quadrature-phase, IQ, samples of a subchannel in the plurality of subchannels 510 as an input 903 and output a probability value 904 for each configuration in the plurality of possible demodulation reference signal configurations being active in the subchannel, wherein each configuration in the plurality of possible demodulation reference signal configurations defines active demodulation reference signal transmissions in the subchannel.

The at least one detection model may take as an input the modulated symbols or IQ samples of a single subchannel. Thus, the at least one detection model can detect the presence of DMRS at each symbol within the subchannel. The client device 200 may use the at least one detection model for each subchannel.

For example, the at least one detection model can output a soft value for each DMRS configurations detected as active within the time slot 511.

The ML classifiers 901, 902 can comprise multi-label, multi-class classifiers which can be implemented with a variety of algorithms such as deep neural networks (DNN), decision forests (DF), etc. with cross entropy or KL-divergence loss function and, for example, sigmoid activation function.

Figure 10:
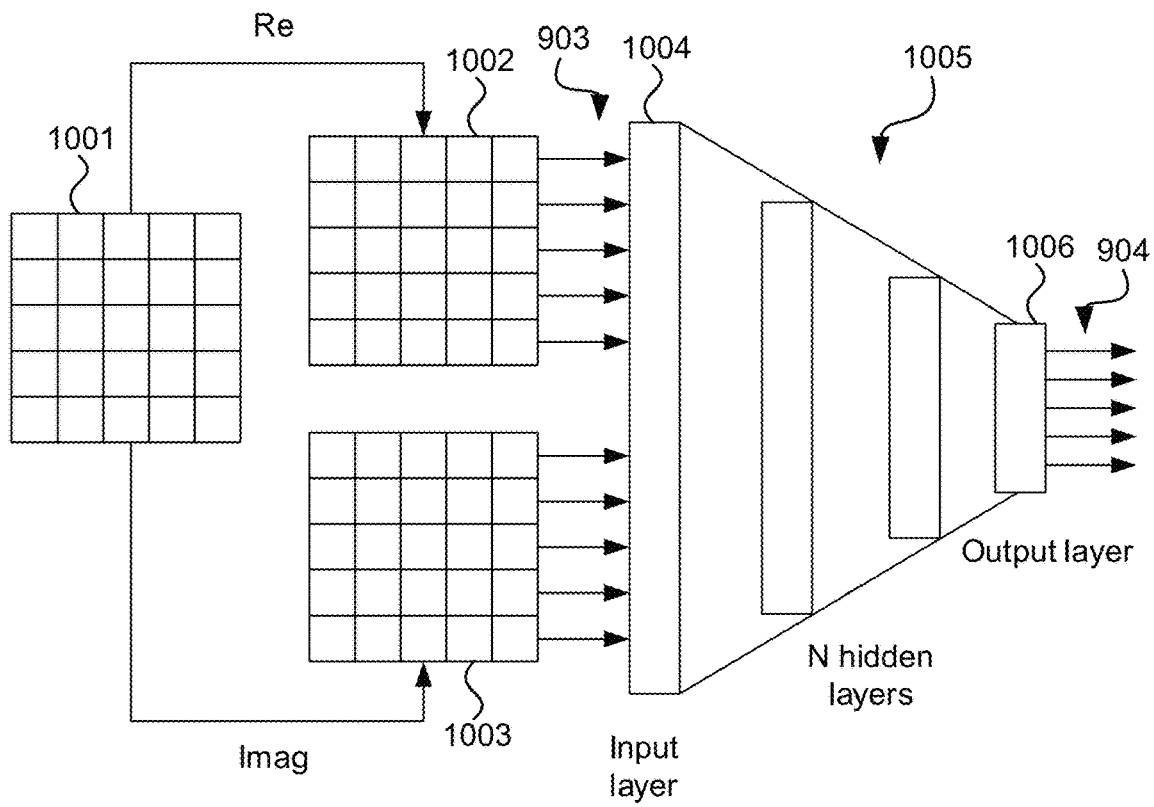
FIG. 10 shows another example embodiment of the subject matter described herein illustrating data flow in a machine learning model.

FIG. 10 shows another example embodiment of the subject matter described herein illustrating data flow in a machine learning model.

The received signal samples 1001 can be split into a real 1002 and imaginary 1003 parts and fed into the input layer 1004 the at least one ML model. In the example embodiment of FIG. 10, the at least one ML model comprises a DNN with N hidden layers 1005. The output layer 1006 of the DNN can produces a K-dimensional output. For example, K=7 for PSSCH DMRS classifier and K=3 otherwise. The kth output value $p_k$ can denote the probability that at least one signal of configuration k is present in the received sidelink signal.

One benefit of using a detection model, such as an ML model, instead of, for example, sequential detection is that the detection model can provide a one-shot outcome, i.e. all configurations can be detected simultaneously. With sufficient training, the classification can be robust to noise—whereas the other options may be sensitive to noise.

The at least one ML model or any component thereof, such as the classifiers 901, 902 can be pre-trained in a simulated (or replay) environment, in order to establish a baseline. For example, the received signals for training may be obtained by:

Varying the number Z of SL clients transmitting simultaneously (including the case of overlapped resource selection). Vary Z in set S, where e.g. S={1, 2, ..., 100}.

Varying the noise regime. For example, simulate SNR in range R, where e.g. R={−10, −5, 0, 5} dB.

Varying mobility regimes. For example, simulate Doppler dispersive channels with maximum Doppler shift in range D, where e.g. D={0, 5, 50} Hz.

Additionally, some example embodiments may comprise an online training component, which may include at least some of the following aspects:

The identification of the valid inputs and outputs.

Every time a PSCCH DMRS or PSSCH DMRS configuration is detected correctly (i.e. the PSCCH is detected and decoded successfully and then the indicated PSSCH DMRS configuration matches the detected PSSCH DMRS configuration), the corresponding inputs can be stored for training.

The samples for training can be retrained only for a period of time, corresponding to how often the characteristics of the environment (congestion, propagation, receiver speed) change.

The training can follow, for example, a reinforced learning approach or based on parallel training every x period of time.

The training can be triggered based on, for example, elapsed time or when the number of collected samples goes above a certain threshold.

According to an example embodiment, the at least one memory and the computer program code are further configured to, with the at least one processor, cause the client device 200 to: in response to the at least one decoding path being successful in decoding the plurality of payload transmissions in the time slot 511, store input and outputs of the at least one machine learning model; and retrain the at least one machine learning model using the stored inputs and outputs.

Figure 11:
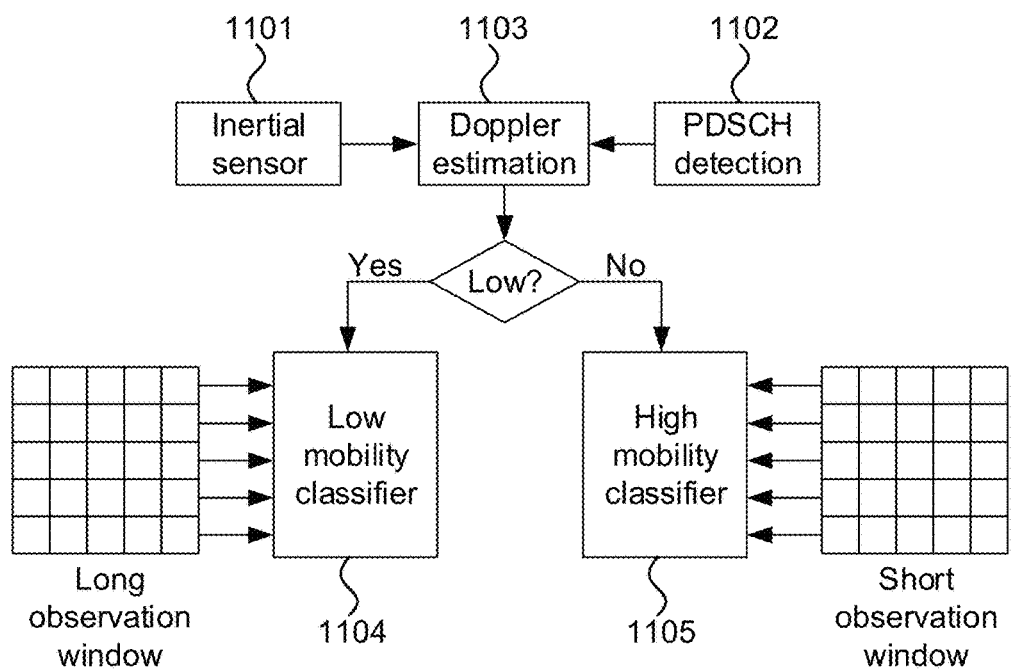
FIG. 11 shows an example embodiment of the subject matter described herein illustrating a machine learning model comprising a component trained for low mobility and a component trained for high mobility.

FIG. 11 shows an example embodiment of the subject matter described herein illustrating a machine learning model comprising a component trained for low mobility and a component trained for high mobility.

According to an example embodiment, the at least one machine learning model comprises a first machine learning model trained for low mobility and a second machine learning model trained for high mobility.

Low mobility (lowM) may also be referred to as low Doppler and high mobility (highM) may also be referred to as high Doppler.

The client device 200 may comprise an inertial sensor 1101. Based on inertial sensor signal and/or PDSCH detection 1102, the client device 200 may perform Doppler estimation 1103. In other example embodiments, the client device 200 may perform Doppler estimation based on other available information. If the client device 200 detects low mobility, the client device may use a low mobility classifier 1104. Otherwise, the client device 200 may use a high mobility classifier 1105.

One reason for the distinction between low and high mobility is the size of the observation window to be fed to the ML model. For high mobility clients, a shorter observation window is necessary, while the opposite applies for the low mobility client. Thus, the first machine learning model trained for low mobility may be trained using long observations windows and the second machine learning model trained for high mobility may be trained using short observations windows.

Although the at least one detection model is implemented using an ML model in some example embodiments disclosed herein, the at least one detection model may also be implemented in other ways. For example, the at least one detection model may comprise individual detectors, such as matched filters, for each of the possible DMRS sequences in PSCCH and/or PSSCH. A sequence could be considered as detected when the output of the individual detector is above a preconfigured threshold. For example, when assuming that the output is a soft value between 0 and 1, a sequence may be deemed as present when the corresponding value is above 0.7, as an illustrative example.

Figure 12:
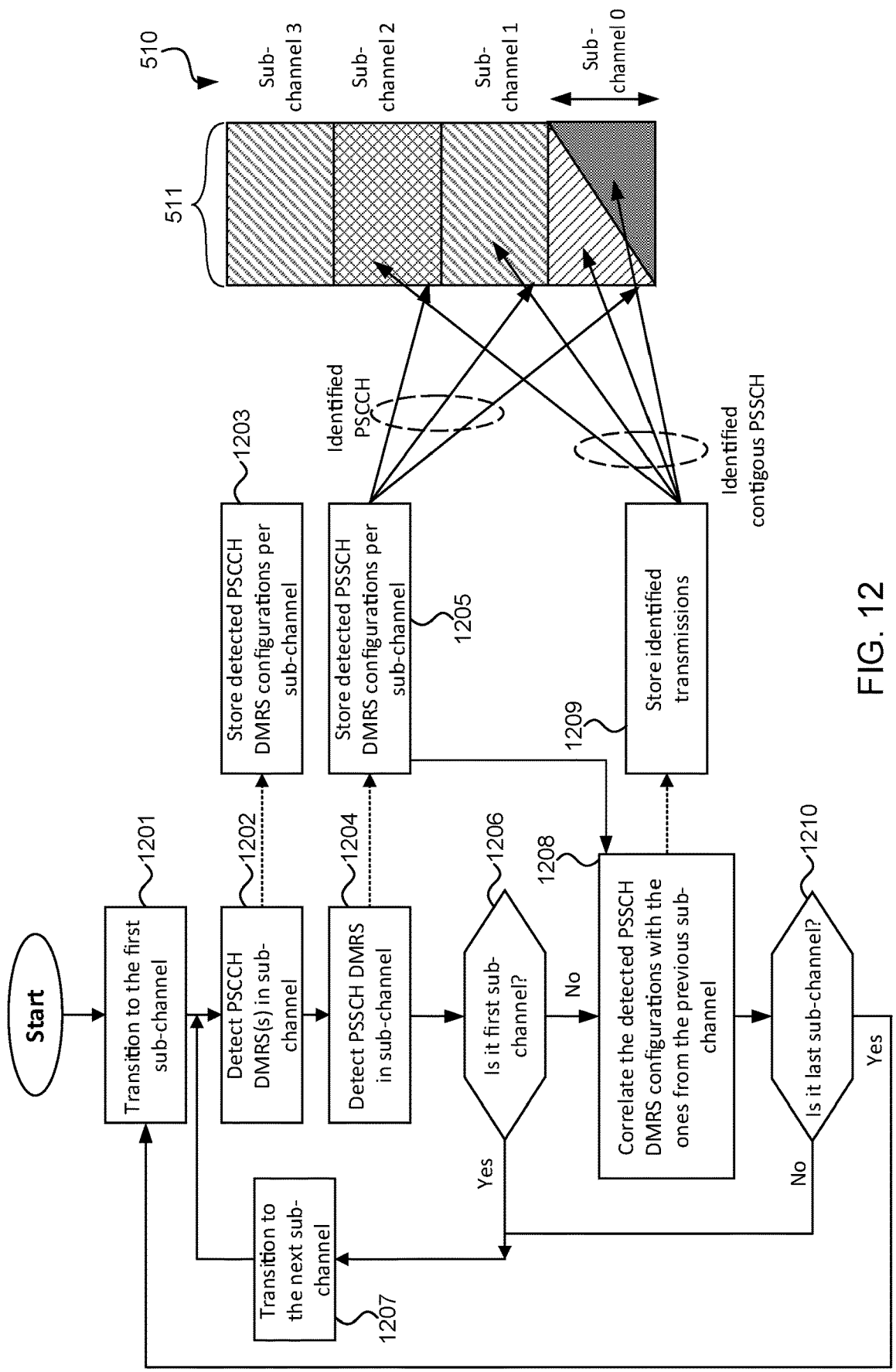
FIG. 12 shows an example embodiment of the subject matter described herein illustrating a flow chart of a decoding generation procedure.

FIG. 12 shows an example embodiment of the subject matter described herein illustrating a flow chart of a decoding generation procedure.

Using the procedure of FIG. 12, the client device 200 can detect PSCCH and PSSCH transmissions over contiguous subchannels based on the correlation of PSSCH DMRS configurations detected in each adjacent subchannel.

After acquiring the information of which PSCCH DMRS configurations and PSSCH DMRS configurations are active in the subchannels 510 of a time slot 511, the client device 200 can apply the procedure depicted in FIG. 12 to identify the individual transmissions. The processing may be applied for a subset of the most probable detected configurations, for example those with $p_i$ above a certain threshold, wherein $p_i$ denotes the probability that at least one signal of configuration k is present in the received signal.

According to an example embodiment, the at least one memory and the computer program code are further configured to, with the at least one processor, cause the client device 200 to create the at least one decoding path for the payload transmissions in such a way that the at least one decoding path maximises a number of decoded transmissions.

In operation 1201, the client device 200 can transition to a first subchannel.

In operation 1202, the client device 200 can detect PSCCH DMRS(s) in the current subchannel.

In operation 1203, the client device 200 can store the detected PSCCH DMRS configurations per subchannel.

In operation 1204, the client device 200 can detect PSSCH DMRS in the current subchannel.

In operation 1205, the client device 200 can store detected PSSCH DMRS configurations per subchannel.

In operation 1206, the client device 200 can check whether the current subchannel is the first subchannel. If the current subchannel is the first subchannel, the client device 200 can perform operation 1207 and transition to the next subchannel and transition back to operation 1202. Otherwise, the client device 200 can transition to operation 1208.

In operation 1208, the client device 200 can correlate the detected PSSCH DMRS configurations with detected PSSCH DMRS configurations from the previous subchannel using the stored PSSCH DMRS.

According to an example embodiment, the at least one memory and the computer program code are further configured to, with the at least one processor, cause the client device 200 to identify the payload transmissions in the time slot 511 based on the identified plurality of potentially active demodulation reference signal configurations in the time slot 511 by correlating between symbols across subchannels in the plurality of subchannel 510 in order to identify payload transmission occurring across subchannels in the plurality of subchannels 510.

In operation 1209, the client device 200 can store the identified transmissions.

In operation 1210, the client device 200 can check whether the current subchannel is the last subchannel in the time slot 511. If the current subchannel is the last subchannel in the time slot 511, the client device 200 can transition to the next time slot and transition to operation 1201. Otherwise, the client device can transition to operation 1207.

The client device 200 may be configured to create at least one decoding path for the plurality of payload transmissions in the time slot 511 based further on the magnitude/power of the DMRS.

According to an example embodiment, the at least one memory and the computer program code are further configured to, with the at least one processor, cause the client device 200 to create the at least one decoding path for the payload transmissions by performing: compute a reference signal received power, RSRP, for each demodulation reference signal configuration in the plurality of potentially active demodulation reference signal configurations; rank the plurality of potentially active demodulation reference signal configurations according to the computed RSRP of each potentially active demodulation reference signal configuration; and create the at least one decoding path based on the ranking of the plurality of potentially active demodulation reference signal configurations.

According to an example embodiment, the at least one memory and the computer program code are further configured to, with the at least one processor, cause the client device 200 to create the at least one decoding path based on the ranking by excluding from at least one decoding path potentially active demodulation reference signal configurations with an RSRP lower than a preconfigured threshold RSRP.

According to an example embodiment, the at least one memory and the computer program code are further configured to, with the at least one processor, cause the client device 200 to decode the payload transmission according to the created at least one decoding path.

The client device 200 can create the at least one decoding path using, for example, the following operations:
  Compute the RSRP associated with each potentially active DMRS configuration detected for both PSSCH and PSCCH.
  Rank the different (potential) transmissions based on both PSCCH and PSSCH RSRPs.
    For a successful decoding of the transmission, it is required that both PSCCH and PSSCH RSRPs are strong, i.e. above a predefined threshold RSRP high.
    Exclude from the decoding paths all transmissions where the associated RSRPs are below a configured threshold RSRP low (e.g. associated with the receiver sensitivity).

Figure 13:
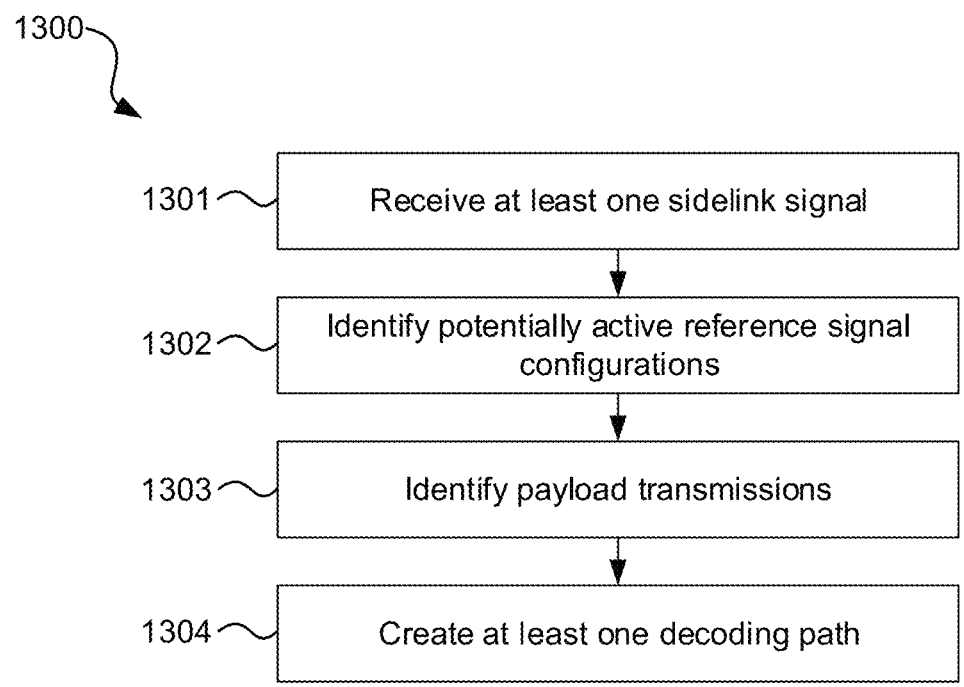
FIG. 13 shows an example embodiment of the subject matter described herein illustrating a method.

FIG. 13 shows an example embodiment of the subject matter described herein illustrating a method.

According to an example embodiment, the method 1300 comprises receiving 1301 at least one sidelink signal in a time slot over a plurality of subchannels.

The method 1300 may further comprise identifying 1302, using at least one detection model, a plurality of potentially active demodulation reference signal configurations out of a plurality of possible demodulation reference signal configurations in the time slot 511 across the plurality of subchannels based on the at least one sidelink signal, wherein each demodulation reference signal configuration defines demodulation reference signal transmissions in the time slot 511.

The method 1300 may further comprise identifying 1303 a plurality of payload transmissions in the time slot 511 based on the identified plurality of potentially active demodulation reference signal configurations in the time slot 511.

The method 1300 may further comprise creating 1304 at least one decoding path for the plurality of payload transmissions in the time slot 511 based on the identified plurality of payload transmissions in the time slot 511 and the identified plurality of potentially active demodulation reference signal configurations.

It is to be understood that the order in which operations 1301-1304 are performed, may vary from the example embodiment depicted in FIG. 13.

The method 1300 may be performed by the client device 200 of FIG. 2. Further features of the method 600 directly result from the functionalities and parameters of the client device 200. The method 600 can be performed, at least partially, by computer program(s).

An apparatus may comprise means for performing any aspect of the method(s) described herein. According to an example embodiment, the means comprises at least one processor, and memory comprising program code, the at least one processor, and program code configured to, when executed by the at least one processor, cause performance of any aspect of the method.

The functionality described herein can be performed, at least in part, by one or more computer program product components such as software components. According to an example embodiment, the client device 200 comprises a processor configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

The invention claimed is:

1. A client device, comprising:
   at least one processor; and
   at least one memory including computer program code;
   the at least one memory and the computer program code configured to, with the at least one processor, cause the client device to:
   receive at least one sidelink signal in a time slot over a plurality of subchannels;
   identify, using at least one detection model, a plurality of potentially active demodulation reference signal configurations out of a plurality of possible demodulation reference signal configurations in the time slot across the plurality of subchannels based on the at least one sidelink signal, wherein each demodulation reference signal configuration defines demodulation reference signal transmissions in the time slot;
   identify a plurality of payload transmissions in the time slot based on the identified plurality of potentially active demodulation reference signal configurations in the time slot; and
   create at least one decoding path for the plurality of payload transmissions in the time slot based on the identified plurality of payload transmissions in the time slot and the identified plurality of potentially active demodulation reference signal configurations.

2. The client device according to claim 1, wherein the demodulation reference signal transmissions in the time slot comprise at least demodulation reference signal transmissions for a control channel and demodulation reference signal transmissions for a data channel, and wherein the plurality of payload transmissions comprises at least the control channel and the data channel.

3. The client device according to claim 1, wherein the plurality of payload transmissions comprises physical sidelink control channel, PSCCH, transmissions and/or physical sidelink shared channel, PSSCH, transmissions, and the demodulation reference signal transmissions comprise PSCCH demodulation reference signal, DMRS, transmissions and/or PSSCH DMRS transmission.

4. The client device according to claim 1, wherein the at least one detection model comprises at least one machine learning model.

5. The client device according to claim 4, wherein the at least one machine learning model comprises at least one of: a multi-label multi-class classifier, a neural network, a deep neural network, or a decision forest.

6. The client device according to claim 4, wherein the at least one machine learning model is configured to take modulated symbols or in-phase—quadrature-phase, IQ, samples of a subchannel in the plurality of subchannels as an input and output a probability value for each configuration in the plurality of possible demodulation reference signal configurations being active in the subchannel, wherein each configuration in the plurality of possible demodulation reference signal configurations defines active demodulation reference signal transmissions in the subchannel.

7. The client device according to claim 1, wherein the at least one memory and the computer program code are further configured to, with the at least one processor, cause the client device to identify the payload transmissions in the time slot based on the identified plurality of potentially active demodulation reference signal configurations in the time slot by correlating between symbols across subchannels in the plurality of subchannel in order to identify payload transmission occurring across subchannels in the plurality of subchannels.

8. The client device according to claim 4, wherein the at least one machine learning model comprises a first machine learning model trained for low mobility and a second machine learning model trained for high mobility.

9. The client device according to claim 1, wherein the at least one memory and the computer program code are further configured to, with the at least one processor, cause the client device to create the at least one decoding path for the payload transmissions in such a way that the at least one decoding path maximises a number of decoded transmissions.

10. The client device according to claim 1, wherein the at least one memory and the computer program code are further configured to, with the at least one processor, cause the client device to create the at least one decoding path for the payload transmissions by performing:
    compute a reference signal received power, RSRP, for each demodulation reference signal configuration in the plurality of potentially active demodulation reference signal configurations;
    rank the plurality of potentially active demodulation reference signal configurations according to the computed RSRP of each potentially active demodulation reference signal configuration; and
    create the at least one decoding path based on the ranking of the plurality of potentially active demodulation reference signal configurations.

11. The client device according to claim 10, wherein the at least one memory and the computer program code are further configured to, with the at least one processor, cause the client device to create the at least one decoding path based on the ranking by excluding from at least one decoding path potentially active demodulation reference signal configurations with an RSRP lower than a preconfigured threshold RSRP.

12. The client device according to claim 1, wherein the at least one memory and the computer program code are further configured to, with the at least one processor, cause the client device to decode the payload transmission according to the created at least one decoding path.

13. The client device according to claim 4, wherein the at least one memory and the computer program code are further configured to, with the at least one processor, cause the client device to:
    in response to the at least one decoding path being successful in decoding the plurality of payload transmissions in the time slot, store input and outputs of the at least one machine learning model; and
    retrain the at least one machine learning model using the stored inputs and outputs.

14. A method, comprising:
    receiving at least one sidelink signal in a time slot over a plurality of subchannels;
    identifying, using at least one detection model, a plurality of potentially active demodulation reference signal configurations out of a plurality of possible demodulation reference signal configurations in the time slot across the plurality of subchannels based on the at least one sidelink signal, wherein each demodulation reference signal configuration defines demodulation reference signal transmissions in the time slot;

identifying a plurality of payload transmissions in the time slot based on the identified plurality of potentially active demodulation reference signal configurations in the time slot; and creating at least one decoding path for the plurality of payload transmissions in the time slot based on the identified plurality of payload transmissions in the time slot and the identified plurality of potentially active demodulation reference signal configurations.

15. The method according to claim 14, wherein the demodulation reference signal transmissions in the time slot comprise at least demodulation reference signal transmissions for a control channel and demodulation reference signal transmissions for a data channel, and wherein the plurality of payload transmissions comprises at least the control channel and the data channel.

16. The method according to claim 14, wherein the plurality of payload transmissions comprises physical sidelink control channel, PSCCH, transmissions and/or physical sidelink shared channel, PSSCH, transmissions, and the demodulation reference signal transmissions comprise PSCCH demodulation reference signal, DMRS, transmissions and/or PSSCH DMRS transmission.

17. The method according to claim 14, wherein the at least one detection model comprises at least one machine learning model.

18. The method according to claim 17, wherein the at least one machine learning model comprises at least one of: a multi-label multi-class classifier, a neural network, a deep neural network, or a decision forest.

19. The method according to claim 17, wherein the at least one machine learning model is configured to take modulated symbols or in-phase—quadrature-phase, IQ, samples of a subchannel in the plurality of subchannels as an input and output a probability value for each configuration in the plurality of possible demodulation reference signal configurations being active in the subchannel, wherein each configuration in the plurality of possible demodulation reference signal configurations defines active demodulation reference signal transmissions in the subchannel.

20. A computer program embodied on a non-transitory computer-readable medium, said computer program comprising program code configured to perform the method according to claim 14, when the computer program product is executed on a computer.

\* \* \* \* \*